May 21, 1968  R. S. JONES ET AL  3,384,198
GROUND EFFECT VEHICLES

Filed Nov. 15, 1965  3 Sheets-Sheet 1

INVENTORS
RICHARD STANTON JONES
BRIAN JOSEPH SUMMERS
LAVIS ALBERT HENRY RIDDLE

BY *Larson and Taylor*

ATTORNEYS

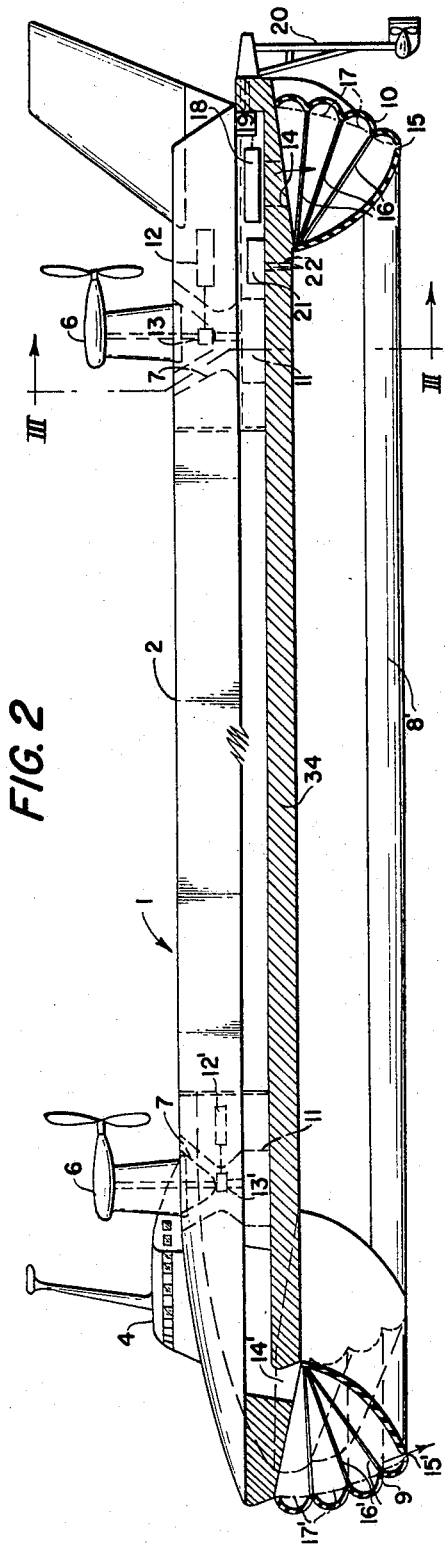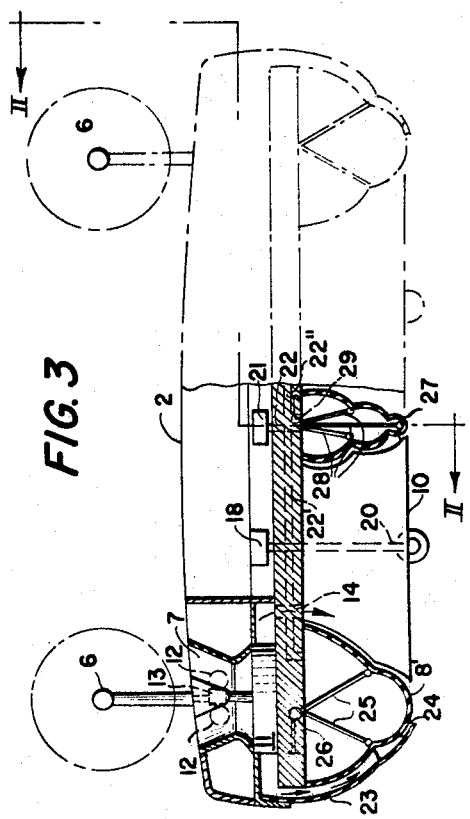

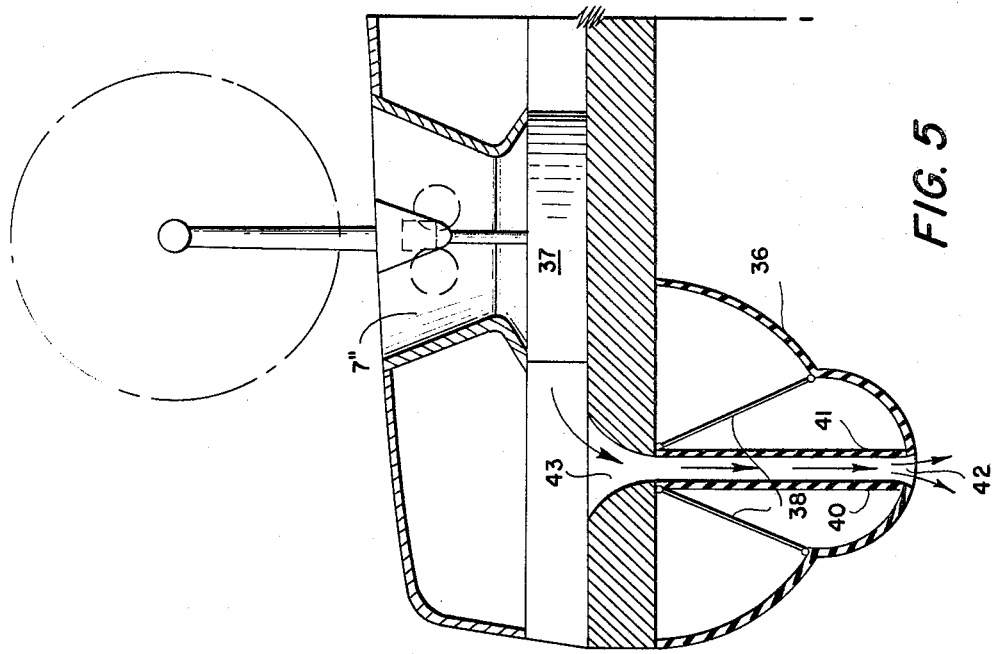
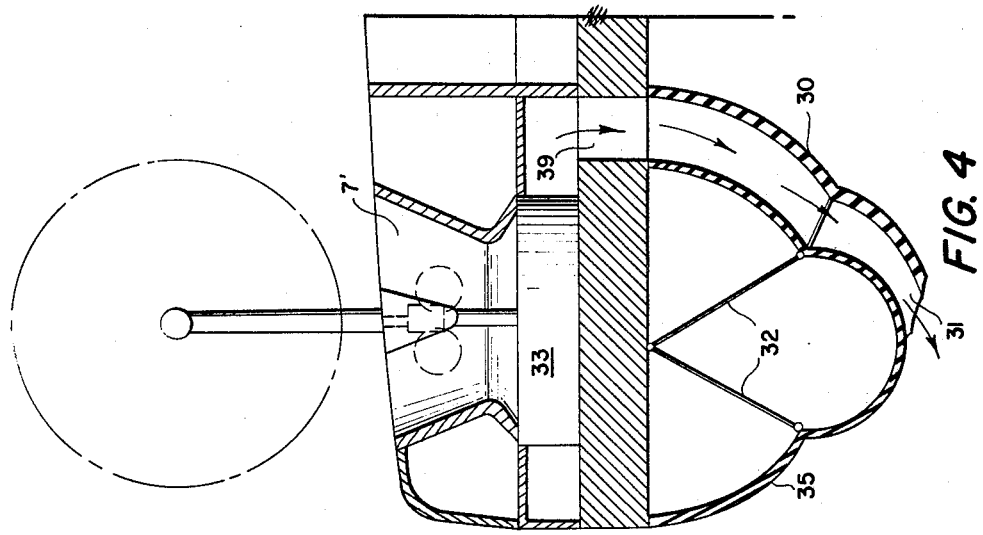

United States Patent Office 3,384,198
Patented May 21, 1968

3,384,198
GROUND EFFECT VEHICLES
Richard Stanton Jones, Cowes, Isle of Wight, Brian Joseph Summers, Fishbourne, near Ryde, Isle of Wight, and Lavis Albert Henry Riddle, East Cowes, Isle of Wight, England, assignors to Westland Aircraft Limited, Yeovil, Somerset, England
Filed Nov. 15, 1965, Ser. No. 507,942
Claims priority, application Great Britain, Nov. 18, 1964, 46,872/64
9 Claims. (Cl. 180—128)

ABSTRACT OF THE DISCLOSURE

A vehicle is capable of operation both as a displacement vehicle and as an air cushion vehicle. A pair of flexible air chambers inflatable from an independent source and depending from a base platform define an air cushion space during air cushion operation and form a hull structure during displacement operation. Bow and stern skirting arrangements are inflatable during air cushion operation to complete the boundaries of the air cushion space and are retracted during displacement operation. Pressurized gas flowing through ducts in part formed by the chambers provides a portion of the supporting air cushion.

---

This invention relates to ground effect vehicles of the type which, during at least part of their operation, are supported on a pressurized gas cushion beneath the vehicle. More particularly, but not exclusively, the invention relates to improvements in such vehicles which are so constructed as to have positive buoyancy sufficient to support and vehicle and its load on water. Such vehicles constructed according to the invention additionally include inflatable floats or buoyancy chambers for supporting the vehicle body or platform clear of the water, and flexible means forming together with the buoyancy chambers flexible ducting through which pressurized gas is passed to form an air curtain adjacent the lower edges of the buoyancy chambers, whereby at least part of the supporting air cushion is built up and maintained under the vehicle. The buoyancy chambers thus function both to support the vehicle when on water and to form flexible extensions of the gas supply duct and flexible barriers for the supporting cushion when in cushion supported travel.

It is the general object of this invention to provide an improved vehicle of the general type set forth above.

According to the invention we provide a vehicle having air cushion forming means and having a multiplicity of longitudinally arranged flexible inflatable chambers connected to, inflated from, and depending downwardly from a base platform structure, said chambers being inflated from a source of pressurized gas to form hull structures, boundary walls of the vehicle air supporting cushion and buoyancy support for the vehicle when on water, flexible and inflatable generally transverse bow and stern chambers which complete the said boundary walls of the air supporting cushion, pressurized gas inflating the said bow and stern chambers issuing through orifices to assist in building and maintaining the air supporting cushion, said bow and stern chambers being retractable to permit the vehicle to operate as a displacement craft when the flow of pressurized gas forming the air supporting cushion ceases.

In some constructions of such a vehicle it may be advantageous to arrange for all the said flexible chambers to be retractable to permit the base platform of the said vehicle to rest on a support surface when non-operational. Automatic retraction of the front and rear transverse chambers may be arranged upon cessation of the flow of pressurized gas to the air supporting cushion.

It is a further object of this invention to provide a ground effect machine having a flexible inflatable structure adapted to extend below the main body of the vehicle, the structure comprising at least one inflated or inflatable chamber and flexible duct means in communication with a pressurized air or gas source, the duct terminating in an outlet adjacent to and extending along the lower part of the inflated chamber, so as to form an air curtain for generating and maintaining at least part of the supporting air cushion.

It is a further object of this invention to provide a large vehicle as set forth in the preceding paragraph, wherein the chamber is inflated to a relatively high pressure and the pressurized gas source supplying the flexible duct is at a relatively low pressure. The feature of the invention by which this object is accomplished is based upon the discovery that for large ground effect vehicles the inflationary pressure necessary to withstand impact from obstructions is substantially greater than the air or gaseous pressure required to build up and maintain the ground effect cushion, whereas for comparatively small ground effect vehicles the pressures are substantially equal.

It is a further object of this invention provide a vehicle as set forth in the preceding paragraphs, which includes two flexible inflatable buoyancy chambers extending in the fore and aft direction and capable of supporting the vehicle body clear of the water.

It is a still further object of this invention to provide a vehicle as set forth in the preceding paragraphs including flexible skirting assemblies extending below the main body of the vehicle and between adjacent buoyancy chambers at the bow and stern of the vehicle, each skirting assembly preferably being retractable and formed as a flexible inflatable member having a nozzle opening extending along its lower edge, the interior of the assembly being connected to the relatively low pressure gas, whereby the low pressure gas forms an air curtain substantially around the entire periphery of the vehicle and its flexible depending members.

It is a still further object of this invention to provide vehicles as set forth in any of the preceding paragraphs, wherein the low pressure flexible air ducts are formed in conjunction with the high pressure inflated chambers in certain novel and advantageous manners, as will be apparent from the ensuing description and drawings.

Other and further objects, features and advantages of the invention will be apparent to those skilled in the art from the disclosure and drawings. We have set forth with particularity in the appended claims those novel features which we consider characteristic of our invention, but the invention itself will be best understood from the following description, explanation and illustration of certain exemplary and preferred embodiments of the invention.

Referring to the drawings:

FIGURE 2 is a somewhat diagrammatic side view of the vehicle shown in FIGURE 1, partly in section, the section being taken generally along line II—II of FIGURE 3.

FIGURE 3 is a sectioned elevation view of the machine shown in FIGURES 1 and 2, the section being taken generally along line III—III of FIGURE 2.

FIGURE 4 is a fragmentary diagrammatical view, partly in section, illustrating an alternative arrangement, whereby the flexible duct is formed on the inner side of the inflated buoyancy chamber.

FIGURE 5 is a view similar to FIGURE 4 illustrating an alternative arrangement, whereby the flexible duct is formed so as to extend through the interior of the inflated buoyancy chamber and divide the chamber in effect into two compartments.

Figure 1:
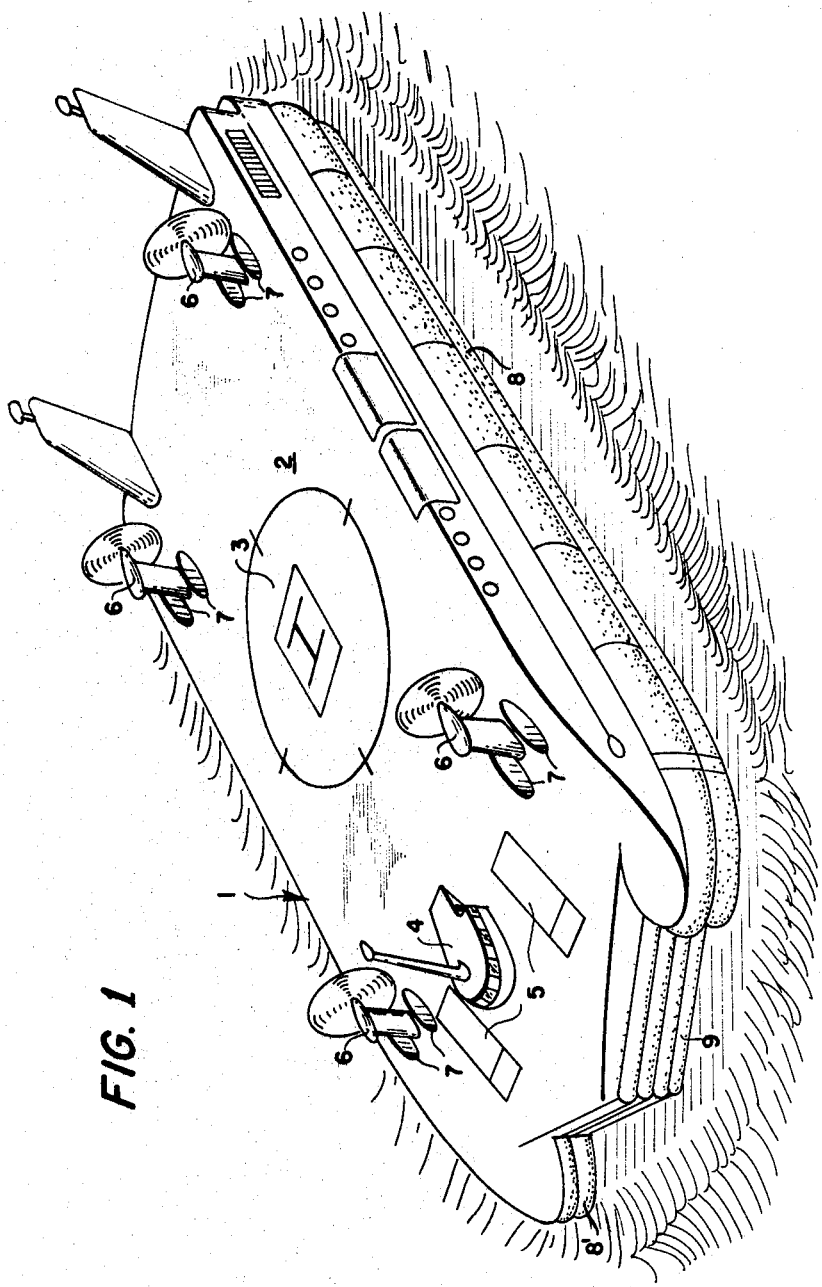
FIGURE 1 is a perspective view of a large vehicle constructed in accordance with one embodiment of the invention.

As illustrated in FIGURE 1, a large ground effect vehicle generally indicated at 1 comprises a rigid base platform structure having a flat top deck 2 which includes, for instance, a landing space 3 for helicopters. The base platform structure includes a control cabin 4, pylon mounted propellers 6, and access doorways 5 which may be opened for launching missiles or the like if desired. Cushion air intakes are shown at 7 in the vicinity of each pylon mounted propeller. Depending from the sides of the vehicle and running for the entire length thereof are inflated chambers 8 and 8' which are formed of flexible material and restrained to assume a double bubble configuration as illustrated in FIGURE 3. A flexible skirting assembly 9 is provided at the bow of the vehicle extending between the flexible inflated chambers 8 and 8'. The bow skirt assembly is arrow-headed in planform, and the forward portions of the flexible inflated chambers in front of the adjacent portions of the flexible bow skirting assembly. This arrangement gives the vehicle an improved ability to ride over waves during ground effect operation.

Referring now to FIGURES 2 and 3, FIGURE 2 is a partially sectioned elevation view with the inflated center keel removed for clarity. The vehicle is formed with a flat bottomed platform 34 which is buoyant, being for example an assembly of buoyancy chambers capable of supporting the machine on water. The bow skirt assembly 9 is formed of any well known suitable flexible material and comprises a front or outer wall formed with a plurality of horizontal accordian pleats and a rear or inner wall formed as a simple sheet of flexible material which presents a convex surface to the air cushion area when inflated. A plurality of ties 16' extend between the front flexible wall of the bow skirt and the rigid structure of the machine to maintain the pleated form when the skirt is inflated. A plurality of elastic ties 17', formed of any suitable elastic material or structure, extend between the pleats so as to accomplish automatic retraction of the skirting assembly when the skirting assembly is deflated. Thus, when the skirting assembly 9 is deflated the elastic tie members 17' urge the adjacent pleats together and thus retract the entire skirt assembly 9 upwardly toward the rigid structure of the vehicle. The rear skirt assembly 10 is substantially identical to the bow skirt assembly 9, but preferably the rear skirt assembly 10 is formed as two separate sections separated from each other by the longitudinal stability keel 27. This arrangement gives additional flexibility to the rear skirt assembly and reduces the tendency of the rear skirt to split due to build up of water or impact with obstacles. The rear skirting assembly 10 has tie members 16 and elastic ties 17 corresponding in structure to the members 16' and 17' of the bow skirting assembly. The sub-divided character of the rear skirting assembly 10 will be clear from FIGURE 3, where one rear skirting assembly is shown as extending between the inflated buoyancy chamber 8' and the longitudinal stability keel 27. The rear skirting assembly is provided with a nozzle opening 15 extending along its bottom edge, and the bow skirting assembly is provided with a corresponding nozzle opening 15'. Thus, when the flexible skirting assemblies are inflated, the inflating air will issue from these nozzle openings in the form of air curtains to assist in the build up and maintenance of the supporting air cushion under the platform 34.

As shown in the right hand portion of FIGURE 2, the pylon mounted propeller 6 is driven by a power plant 12 through gearbox 13. The power plant 12 also transmits drive power through the gearbox 13 to a centrifugal fan 11, which generates the pressurized air for forming the supporting air cushion and for inflating the bow and stern skirting assemblies. The fan 11 draws air through intakes 7 and passes pressurized air to the rear skirting assembly 10 through a passage 14 in the platform of the machine, as illustrated in FIGURES 2 and 3. The power plant for the pylon mounted propeller 6 and fan 11' shown in the left hand portion of FIGURE 2 is indicated at 12', and the passage for passing pressurized air to the bow skirting assembly 9 is indicated at 14'. Corresponding arrangements are provided at each of the pylon mounted propellers 6.

An alternative arrangement for propelling the vehicle when it is supported on water is provided by a pair of water propeller assemblies, one of which is shown at 20 in FIGURES 2 and 3, driven by alternative power plants 18 through transmissions 19. The water propellers are carried on struts which may be swung upwardly for retraction by any suitable means, and the water propellers may be adapted to rotate in azimuth or to operate in conjunction with rudders, so as to provide means for propelling and steering the vehicle during displacement operation. Suitable structures for accomplishing such operation are well known in the art and will be apparent to persons skilled in the art. The particular structures in themselves form no part of the instant invention.

Referring now to FIGURE 3, the details of only the port side of the machine are illustrated, since the machine is symmetrical about its longitudinal center line. As shown in FIGURE 3, the longitudinal buoyancy chamber 8' is formed of a flexible material and is constrained by tie members 25 to assume a double bubble configuration when inflated. The pressurized gas for inflating the buoyancy chambers 8 and 8' is provided by a separate compressor 21 which supplies pressurized air at a relatively high pressure to passages 22, 22' and 22" which direct the high pressure air to the buoyancy chambers. Compressor 21 also supplies high pressure air to longitudinal stability keel 27 through passage 22. Keel 27 is constrained by tie members 28 to assume the configuration shown in FIGURE 3. The air in the buoyancy chambers 8 and 8' and in the stability keel 27 is at a relatively high pressure of the order of 3–10 p.s.i., whereas the air pressure generated by the fans 11 and 11' for maintaining the air cushion is at a relatively lower level in the vicinity of ½–1 p.s.i.

Preferably the buoyancy chambers and the stability keel can be retracted by retracting their tie members 25 and 28 upwardly around pulleys 26 and 29 respectively.

As best shown in FIGURE 3, a sheet 23 of flexible material extends downwardly from the rigid base structure of the vehicle and is constrained to lie outwardly of and approximately parallel to the outer wall of buoyancy chamber 8'. Flexible sheet 23 terminates adjacent the lower edge of the buoyancy chamber 8' and together with the buoyancy chamber 8' forms a nozzle opening extending longitudinally along the lower edge of the buoyancy chamber. Pressurized air from centrifugal fan 11, and also from centrifugal fan 11', passes downwardly through the flexible duct formed between sheet 23 and buoyancy chamber 8' to issue from the longitudinal nozzle 24 in the form of an air curtain to build up and maintain the air cushion underneath the platform 34 and between the buoyancy chambers 8 and 8' and the skirting assemblies 9 and 10. Thus, when the bow and stern skirting assemblies 9 and 10 are inflated, an air curtain is formed substantially continuously around the periphery of the flexible understructure of the vehicle.

The operation of the vehicle illustrated in FIGURES 1–3 will be apparent from the foregoing description. For cushion supported operation, the main power plants 12, 12', etc., drive the centrifugal fans 11, 11', etc., to supply relatively low pressure air to the ducts defined between the outboard flexible sheets and the respective buoyancy chambers and to the bow and stern flexible skirting assemblies, thus building up a supporting air cushion underneath the vehicle. The buoyancy chambers 8 and 8' at the same time are inflated to a relatively high pressure by the compressor 21, and the supporting air cushion is thus bounded by the buoyancy chambers and by the bow and stern flexible skirting assemblies. For stability purposes, and also to provide additional buoyancy for the flexible understructure, the stability keel 27 is also inflated to a relatively high pressure by the compressor 21. The vehicle, thus supported on the supporting air cushion, is propelled by the pylon mounted propellers 6 which are also driven by the main power plants 12, 12', etc. As is well known in the art, the pylons are adapted to swivel so as to give directional control.

To change over to displacement operation on water, the supply of pressurized air to the air cushion space is cut off or substantially reduced, thus causing the vehicle to alight on the water. In the embodiment shown in FIGURES 1–3, when the pressurized cushion air from the centrifugal fans is terminated or reduced the reduced pressure in the bow and stern skirting assemblies 9 and 10 results in automatic retraction of the skirting assemblies by virtue of the elastic forces exerted by the elastic tie members 17 and 17'. The pressurized air to the buoyancy chambers and the stability keel 27 is maintained, and as previously pointed out the positive buoyancy of these chambers is such that the rigid structure of the vehicle is maintained clear of the water surface. The vehicle can now be propelled as a displacement craft by the propeller assemblies 20 which are driven by the alternate power plants 18. Because of the configuration of the buoyancy chambers and the retraction of the bow and stern skirting assemblies, the water drag is reduced to a minimum. The vehicle during displacement operation thus acts as a catamaran or tri-maran displacement craft, depending upon whether the stability keel 27 is retracted or inflated. Finally, if desired, the entire flexible understructure can be retracted by retracting the tie members around the pulleys 26 and 29.

FIGURE 4 shows an alternative arrangement wherein the duct for passing air to the supporting air cushion is formed on the interior side of a buoyancy chamber 35 by a flexible sheet member 30. Tie members 32 restrain the buoyancy chamber 35 to adopt the configuration shown in FIGURE 4, which is the same configuration as illustrated in the previous figures. The centrifugal fan 33 receives air from intake 7' and passes it through passage 39 and the flexible duct defined by sheet 30, and the pressurized air issues through longitudinal nozzle 31 in the form of an air curtain. Except for the different location of the flexible air duct and the passage 39, the structure of the embodiment illustrated in FIGURE 4 is otherwise substantially identical to that of the embodiment of FIGURES 1–3.

A further alternative embodiment of the invention is shown in FIGURE 5. In this embodiment the flexible duct is formed in the interior of the buoyancy chamber 36 by flexible sheet members 40 and 41, the duct terminating in a longitudinal nozzle outlet 42 along the lower edge of the buoyancy chamber 36. Centrifugal fan 37 receives air from intake 7'' and passes pressurized air through opening 43 and down through the flexible duct defined by members 40 and 41. Tie members 38 function as in the previous embodiments to constrain the buoyancy chamber 36 to assume a double bubble configuration. Wall members 40 and 41 in effect divide the buoyancy chamber into two separate compartments of which members 40 and 41 form the inner walls. It will, of course, be apparent, however, that transverse passages could be formed to communicate the two compartments through members 40 and 41. Except for the relocation of the flexible duct in the interior of the buoyancy chambers, the structure of the embodiment of FIGURE 5 is otherwise substantially identical to the structures of the previous embodiments.

It will be apparent to those skilled in the art that various refinements and modifications may be incorporated in the vehicles hereinbefore described and illustrated, without departing from the spirit of the invention. Although we have referred only to catamaran or tri-maran arrangements, any suitable number of buoyancy chambers running fore and aft of the vehicle may be employed for the displacement operation. The number of floats or buoyancy chambers employed is limited only by such factors as increased skin friction and increased water drag. To achieve improved stability in certain craft during air cushion travel, flexible ducts for cushion air may be formed in association with the longitudinal stability keel 27 in any of the manners illustrated herein so as to form a further air curtain or curtains to assist in the compartmentation of the supporting cushion during cushion supported travel. Accordingly, it should be understood that the foregoing description and illustrations are merely exemplary of the invention, and that the scope of the invention is as defined in the ensuing claims interpreted in the light of the foregoing description and illustrations.

We claim as our invention:

1. A vehicle capable of operation both as a displacement vehicle and as an air cushion vehicle comprising a base platform structure, means for forming an air cushion under said base platform structure, a plurality of flexible inflatable longitudinal chambers connected to and depending downwardly from said platform structure and extending longitudinally thereof, a flexible inflatable bow chamber located transversely of said base platform, a flexible inflatable stern member located transversely of said base platform, means comprising an independent source of pressurized gas for inflating said longitudinal chambers to form boundary walls for the vehicle air cushion when said air cushion forming means are operative, said source of pressurized gas constituting means for maintaining the pressure of said longitudinal chambers during operation of the vehicle as a displacement vehicle with the air cushion forming means inoperative, said longitudinal chambers constituting means for providing buoyancy support and for serving to form a hull structure during displacement operation, said air cushion forming means inflating said bow and stern chambers to complete said boundary walls for the vehicle air cushion when said air cushion forming means are operative, the pressure of said bow and stern chambers being substantially reduced during operation of the vehicle as a displacement vehicle with the air cushion forming means inoperative, and means for retracting said bow and stern chambers during operation of the vehicle as a displacement vehicle whereby drag caused thereby is substantially eliminated.

2. A vehicle capable of operation both as a displacement vehicle and a gas cushion vehicle comprising a base platform structure, means including a source of pressurized gas for generating and maintaining a supporting gas cushion under said base platform structure, means forming two spaced flexible longitudinal chambers depending downwardly from and extending longitudinally along the base platform substantially parallel to the longitudinal axis of the base platform, inflating means for passing pressurized gas to each of said chambers to inflate the chambers, flexible means forming with each of said flexible inflatable chambers flexible ducts leading downwardly from said base platform structure and terminating in outlet nozzle means adjacent and extending longitudinally along the lower edge of each said inflatable chamber, said air cushion generating means constituting means for passing pressurized gas to said flexible duct to issue as a gas curtain from said outlet nozzle means so as at least partially to build up and maintain a pressurized gas supporting cushion under said base platform, said inflating means being operative during operation of said vehicle both as a displacement vehicle and a gas cushion vehicle, said chambers constituting means defining a cushion space during gas cushion operation and means forming a hull structure during displacement operation, and means forming inflatable flexible skirting assemblies extending below said base platform structure and between said spaced inflatable chambers at the bow and stern of the vehicle to enclose the ends of said cushion space, said skirting assemblies being inflatable from the said source of pressurized gas and being deflated and retracted during displacement operation.

3. Apparatus as set forth in claim 2, wherein at least one of said flexible skirting assemblies comprises a flexible inflatable hollow member having a nozzle outlet extending along the lower edge thereof.

4. Apparatus as set forth in claim 3, further comprising means for automatically retracting said flexible inflatable hollow member when deflated.

5. Apparatus as set forth in claim 4, wherein said flexible inflatable hollow member has at least one wall formed with horizontally extending pleats, and wherein said means for retracting the member comprises means for resiliently urging the pleats together.

6. Apparatus as set forth in claim 2, wherein said means for passing pressurized gas to said chambers comprises means for passing gas thereto at a relatively high pressure, and wherein said means for passing pressurized gas to said flexible duct comprises means for passing gas thereto at a relatively low pressure.

7. A ground effect vehicle as set forth in claim 2, wherein said flexible means comprises a flexible skirt-like member extending along but spaced from the outer surface of each inflatable chamber, so as to define therebetween a continuous duct leading downwardly from the base platform to terminate in an outlet nozzle extending along the lower edge of each flexible inflatable chamber, and means connecting the respective flexible skirt-like members to the respective flexible inflatable chambers in spaced relationship.

8. A ground effect vehicle as set forth in claim 2, wherein said flexible means comprises a flexible skirt-like member extending along but spaced from the inner surface of each inflatable chamber, so as to define therebetween a continuous duct leading downwardly from the base platform to terminate in an outlet nozzle extending along the lower edge of each flexible inflatable chamber, and means connecting the respective flexible skirt-like members to the respective flexible inflatable chambers in spaced relationship.

9. A ground effect vehicle as set forth in claim 2, wherein said flexible means comprises a flexible duct extending downwardly from said base platform through the interior of each of said inflatable chambers and terminating in a nozzle outlet extending along the lower edge of each inflatable chamber, each flexible duct being formed by two spaced flexible walls which divide each inflatable chamber into two subchambers.

References Cited
UNITED STATES PATENTS

| | | | |
|---|---|---|---|
| 3,191,705 | 6/1965 | Jones et al. | 180—7 |
| 3,252,535 | 5/1966 | Jones | 180—7 |
| 3,289,778 | 12/1966 | Page et al. | 180—7 |
| 3,301,343 | 1/1967 | Hardy | 180—7 |

FOREIGN PATENTS 935,620   8/1963   Great Britain.

A. HARRY LEVY, *Primary Examiner*.